United States Patent Office 3,586,680
Patented June 22, 1971

3,586,680
5-IMINO-1,2,4-TRIAZINES
Werner Meiser, Wuppertal-Elberfeld, Ludwig Eue, Cologne-Stammheim, Helmuth Hack, Cologne-Buchheim, Helmut Timmler, Wuppertal-Vohwinkel, and Richard Wegler, Leverkusen, Germany, assignors to Farbenfabriken Bayer Aktiengesellschaft, Leverkusen, Germany
No Drawing. Filed June 25, 1969, Ser. No. 836,609
Claims priority, application Germany, June 29, 1968, P 17 70 750.5
Int. Cl. C07d 55/08
U.S. Cl. 260—249.5                10 Claims

ABSTRACT OF THE DISCLOSURE 5-imino-1,2,4-triazines, i.e. 3-(alkylmercapto, alkylamino and dialkylamino)-4-(alkyl and amino)-5-imino-6-(optionally chloro substituted)-phenyl-1,2,4-triazines, which possess herbicidal properties, and which may be produced by conventional methods.

The present invention relates to and has for its objects the provision for particular new 5-imino-1,2,4-triazines, i.e. 3-(alkylmercapto, alkylamino and dialkylamino)-4-(alkyl and amino)-5-imino-6-(optionally chloro substituted)-phenyl-1,2,4-triazines, which possess valuable, especially selective, herbicidal properties, active compositions in the form of mixtures of such compounds with solid and liquid dispersible carrier vehicles, and methods for producing such compounds and for using such compounds in a new way, especially for combating weeds, undesired plants, and the like, with other and further objects becoming apparent from a study of the within specification and accompanying examples.

It is already known that 1,3,5-triazines can be used for the control of weeds (see Belgian Pat. 540,590). From this group of active compounds, 2,6-di-(ethylamino)-4-chloro-1,3,5-triazine (A) has achieved a considerable practical importance.

It has now been found, in accordance with the present invention, that the particular new 5-imino-1,2,4-triazines of the formula

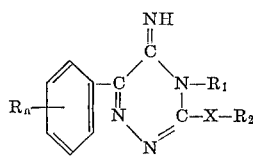

(I)

in which:
R is chloro
$n$ is 0 to 1,
$R_1$ is alkyl of 1–4 carbon atoms or amino,
$R_2$ is alkyl of 1–4 carbon atoms, and
X is sulfur or —$NR_3$—, in which $R_3$ is hydrogen or alkyl of 1–4 carbon atoms, exhibit strong herbicidal, especially selective herbicidal, properties.

It has been furthermore found, in accordance with the present invention, that the particular new compounds of Formula I above may be produced by a process which comprises (a) reacting a hydrazone compound of the formula

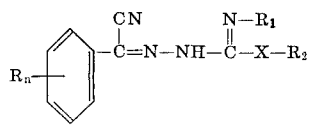

(II)

in which R, $R_1$, $R_2$, X and $n$ are the same as defined above, with an alkali metal cyclization compound in the presence of a solvent, or (b) reacting a hydrazone compound of the formula

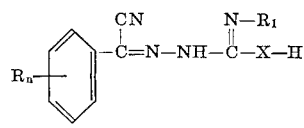

(III)

in which R, $R_1$, X and $n$ are the same as defined above, with an alkali metal cyclization compound in the presence of a solvent, and subsequently or simultaneously introducing the radical —$R_2$ into the resulting 5-imino-1,2,4-triazine by alkylation, i.e. with replacement of the hydrogen atom at X.

It is decidedly surprising that the instant new 5-imino-1,2,4-triazines of benzoyl cyanides according to the present invention exhibit a stronger herbicidal potency than the previously known 1,3,5-triazines such as 2,6-di-(ethylamino)-4-chloro-1,3,5-triazine (A). The instant compounds therefore represent a valuable enrichment of the art.

Advantageously, in accordance with the present invention, in the various formulae herein:

R represents chloro, such as 2,3- and 4-position chloro, especially 4-chloro;
$n$ represents a whole number from 0 to 1;
$R_1$ represents straight and branched chain lower alkyl hydrocarbon of 1–4 carbon atoms such as methyl, ethyl, n- and iso-propyl, n-, iso-, sec.- and tert.-butyl, and the like, especially $C_{1-3}$ or $C_{1-2}$ alkyl; or amino;
$R_2$ represents straight and branched chain lower alkyl hydrocarbon of 1–4 carbon atoms such as methyl to tert.-butyl inclusive, as defined above, and the like, especially $C_{1-3}$ or $C_{1-2}$ alkyl;
X represents sulfur; or —$NR_3$—, such that when X is —$NR_3$—, then X—$R_2$ is

and
$R_3$ represents hydrogen; or hydrogen; or straight and branched chain lower alkyl hydrocarbon of 1–4 carbon atoms such as methyl to tert.-butyl inclusive, as defined above, and the like, especially $C_{1-3}$ or $C_{1-2}$ alkyl.

Preferably, R is chloro, especially 4-chloro; $n$ is 0–1; $R_1$ is $C_{1-4}$ or $C_{1-2}$ alkyl; or amino; $R_2$ is $C_{1-4}$ or $C_{1-2}$ alkyl; X is sulfur; or —$NR_3$—; and $R_3$ is hydrogen.

In particular, R is 4-chloro; n is 0 or 1; $R_1$ is $C_{1-2}$ alkyl or amino; $R_2$ is $C_{1-4}$ alkyl; and X is sulfur or —NH—.

The course of the process variant (a) can be illustrated by the following formula scheme:

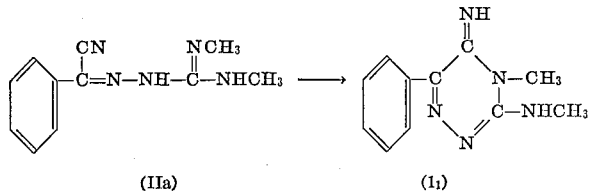

In the following, more detailed information is given concerning the conditions for carrying out process variant (a).

The starting materials required are not yet known, but can be prepared in simple manner by reacting a benzoyl cyanide of the formula:

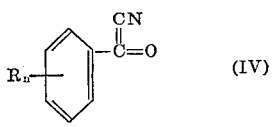

in which:

R and n are the same as defined above with a hydrazine compound of the formula:

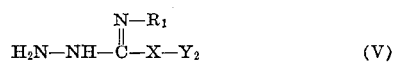

in which:

$R_1$ and X are the same as defined above, and
$Y_2$ is hydrogen or $R_2$ in the presence of water or an alcohol, such as methanol, and possibly in the presence of an inorganic acid, such as nitric acid, at a temperature of from 0 to 100° C. The hydrazone compound of benzoyl cyanide obtained, if $Y_2$, and possibly $R_3$ also, is hydrogen, may be alkylated in known manner with the usual alkylating agents, preferably in neutral or acidic medium.

Solvents suitable for the carrying out of process variant (a) include water and inert organic solvents, particularly alcohols, such as methanol, ethanol and isopropanol.

In order to achieve the desired cyclization according to process variant (a), it is necessary to treat the hydrazone compounds with alkali metal cyclization compounds. For this purpose, alkali metal alcoholates are particularly suitable, for example, potassium methylate or ethylate in anhydrous alcohol; alcoholic solutions of alkali, such as potassium hydroxide or sodium hydroxide in methanol or ethanol, and aqueous solution of alkali, such as solutions of sodium hydroxide or of potassium hydroxide.

The reaction temperatures which may be used for process variant (a) can be varied within a fairly wide range. In general, the reaction is carried out at substantially between about 0–110° C., and preferably between about 40–100° C.

Expediently 1 mol of alkali metal, or less, per mol of starting material is used for the production process according to variant (a).

The working up of the reaction mixture with respect to variant (a) is carried out in customary manner. In most cases, the end products crystallize out when an alcohol is used as solvent.

The course of the process variant (b) can be illustrated by the following formula scheme:

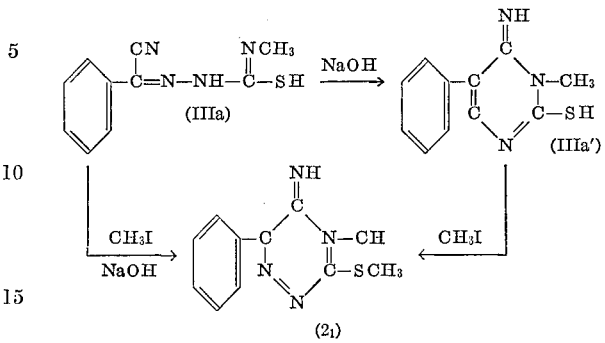

The first step of the process variant (b) takes place in the same manner as explained for process variant (a).

The second step of the process variant (b) is a normal alkylation.

The alkylation is carried out in known manner with alkyl halides such as methyl iodide, ethyl iodide, methyl bromide, ethyl chloride, and the like, or with dialkylsulfuric acid such as dimethylsulfuric acid, and the like, in the presence of acid binders such as alkali metal hydroxide, for example sodium hydroxide, alkali metal carbonates such as potassium carbonate, tertiary amines such as triethylamine and pyridine, and in the presence of solvents such as water, methanol and ethanol, at a temperature of from about 0 to 100° C.

The process variant (b) may be carried out in a single step by simultaneously using the alkali metal cyclization compound and alkylating agent.

Advantageously, the instant active compounds exhibit a strong herbicidal potency and can therefore be used as weed-killers. By weeds are meant in the broadest sense all plants which grow in places where they are not desired. Whether the active compounds according to the present invention act as total or selective herbicidal agents depends on the amount applied, as the artisan will appreciate.

The active compounds according to the present invention can be used for example in the case of the following plants: dicotyledons, such as mustard (Sinapis), cress (Lepidium), cleaver (Galium), common chickweed (Stellaria), mayweed (Matricaria), smallflower (Galinsoga), fathen (Chenopodium), stinging nettles (Urtica), groundsel (Senecio), cotton (Gossypium), beets (Beta), carrots (Daucus), beans (Phaseolus), potatoes (Solanum), coffee (Coffea); monocotyledons, such as timothy (Phleum), bluegrass (Poa), fescue (Festuca), goosegrass (Eleusine), foxtail (Setaria), ryegrass (Lolium), cheat (Bromus), barnyard grass (Echinochloa), maize (Zea), rice (Oryza), oats (Avena), barley (Hordeum), wheat (Triticum), millet (Panicum) and sugar cane (Saccharum); and the like.

The instant active compounds are preferably used as selective herbicides. Such compounds exhibit a markedly good selectivity when used both before and after emergence in cotton, beans, and cereals, such as wheat and maize. The instant compounds are particularly effective against Echinochloa, a weed which is difficult to control.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanolamine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other herbicides, or fungicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.005–0.5%, preferably 0.008–0.1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.005–95%, and preferably 0.008–95%, by weight of the mixture.

In particular, the amount of active compound applied per unit area varies according to the purpose intended, i.e. the effect desired, and the mode of application. In general, substantially between about 0.25–20 kg. of active compound per hectare are applied, and preferably between about 0.5–10 kg. of active compound per hectare, irrespective of the presence or absence of the carrier vehicle.

In this regard, the concentration of the active compound in the usual aqueous preparations and especially in the case of application after emergence is, in general, substantially between about 0.005–0.5%, and preferably between about 0.008–0.1%, by weight, as noted above.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

While the active compounds can be used effectively according to the pre-emergence method, they are also particularly effective when used according to the post-emergence method.

Furthermore, the present invention contemplates methods of selectively killing, combatting or controlling undesired plants, e.g. weeds and the like, which comprise applying to at least one of (a) such weeds and (b) their habitat, i.e. the locus to be protected, a herbicidally effective or toxic amount of the particular compound of the invention alone or together with a carrier vehicle as noted above. The instant formulations or compositions are applied in the usual manner, for example by spraying, atomizing, scattering, dusting, watering, sprinkling, and the like, whether for pre-emergence application to the soil or post-emergence application to the weeds.

It will be realized, of course, that in connection with the pre-emergence use of the instant compounds as well as the post-emergence use thereof, the concentration of the particular active compound utilized in admixture with the carrier vehicle will depend upon the intended application, and may be varied within a fairly wide range, depending upon the weather conditions, the purpose for which the active compound is used, e.g. for total or only selective herbicidal effect, and the plants which are to be controlled or protected. Therefore, in special cases, it is possible to go above or below the aforementioned concentration ranges and amounts per unit area.

The following examples illustrate, without limitation, the herbicidal activity of the particular active compounds of the present invention.

EXAMPLE 1

Pre-emergence test

Solvent: Parts by wt.

Acetone _____ 5
Emulsifier:
    Alkylaryl polyglycol ether _____ 1

To produce a suitable preparation of the particular active compound, 1 part by weight of such active compound is mixed with the stated amount of solvent, the stated amount of emulsifier is added thereto, and the resulting concentrate is then diluted with water to the desired final concentration.

Seeds of the test plants are sown in normal soil and, after 24 hours, watered with the preparation of the given active compound. It is expedient to keep constant the amount of water per unit area. The concentration of the given active compound in the preparation is of no importance, only the amount of active compound applied per unit area being decisive. After three weeks, the degree of damage to the test plants is determined and characterized by the values 0-5, which have the following meaning:

0—No effect
1—Slight damage or delay in growth
2—Marked damage or inhibition of growth
3—Heavy damage and only deficient development or only 50% emerged
4—Plants partially destroyed after germination or only 25% emerged
5—Plants completely dead or not emerged.

The particular active compounds tested, the amounts applied and the results obtained can be seen from the following Table 1:

To produce a suitable preparation of the particular active compound, 1 part by weight of such active compound is mixed with the stated amount of solvent, the stated amount of emulsifier is added thereto, and the resulting concentrate is then diluted with water to the desired final concentration.

Test plants which have a height of about 5-15 cm. are sprayed with the given active compound preparation until just dew moist. After three weeks, the degree of damage to the plants is determined and characterized by the values 0-5, which have the following meaning:

TABLE 1.—PRE-EMERGENCE TEST

| Active compound | | Active compound applied in kg./hectare | Echino- chloa | Cheno- podium | Sinapis | Galin- soga | Stella- ria | Matri- caria | Cotton | Wheat | Maize |
|---|---|---|---|---|---|---|---|---|---|---|---|
| (A) | 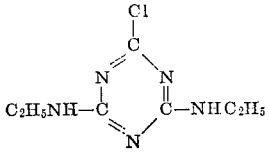 (known) | 5<br>2.5<br>1.25 | 3-4<br>3<br>2 | 5<br>5<br>5 | 5<br>5<br>5 | 5<br>5<br>4-5 | 5<br>5<br>5 | 5<br>5<br>4 | 5<br>4<br>3 | 4<br>3<br>2 | 0<br>0<br>0 |
| (3₁) | 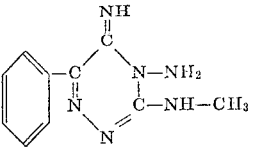 | 5<br>2.5<br>1.25 | 5<br>5<br>5 | 5<br>5<br>3 | 5<br>5<br>4 | 5<br>5<br>5 | 5<br>5<br>4 | 5<br>5<br>5 | 3<br>1<br>0 | 4-5<br>4<br>3 | 4-5<br>4<br>3 |
| (2₂) | 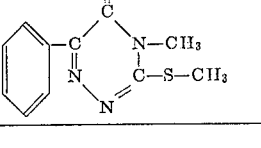 | 5<br>2.5<br>1.25 | 4-5<br>4<br>3 | 5<br>5<br>4 | 5<br>5<br>4 | 5<br>5<br>5 | 5<br>5<br>4 | 5<br>5<br>5 | 1<br>0<br>0 | 2<br>0<br>0 | 2<br>0<br>0 |

EXAMPLE 2

Post-emergence test

Solvent:  Parts by wt.
  Acetone ------------------------------- 5
Emulsifier:
  Alkylaryl polyglycol ether ------------- 1

0—No effect
1—A few slightly burnt spots
2—Marked damage to leaves
3—Some leaves and parts of stalks partially dead
4—Plant partially destroyed
5—Plant completely dead.

The particular active compounds tested, their concentrations, and the results obtained can be seen from the following Table 2:

TABLE 2.—POST-EMERGENCE TEST

| Active compound | Concentration of active compound in percent | Echino- chloa | Cheno- podium | Sinapis | Galin- soga | Stel- laria | Urtica | Matri- caria | Wheat | Beans |
|---|---|---|---|---|---|---|---|---|---|---|
| (A) (known) | 0.1<br>0.05<br>0.025 | 4<br>3<br>2 | 5<br>5<br>4 | 5<br>5<br>5 | 4-5<br>4<br>3 | 5<br>5<br>5 | 5<br>3<br>2 | 5<br>5<br>4 | 4<br>2<br>1 | 3<br>3<br>2 |
| (4₁) | 0.1<br>0.05<br>0.025 | 5<br>4<br>3 | 5<br>5<br>3 | 5<br>5<br>5 | 5<br>5<br>5 | 5<br>5<br>5 | 5<br>5<br>5 | 5<br>5<br>4 | 3<br>1<br>0 | 5<br>5<br>4 |

TABLE 2.—Continued

| Active compound | Concentration of active compound in percent | Echinochloa | Chenopodium | Sinapis | Galinsoga | Stellaria | Urtica | Matricaria | Wheat | Beans |
|---|---|---|---|---|---|---|---|---|---|---|
| ($3_2$) [structure: benzene fused to ring with C=NH, N-NH$_2$, C-NH-CH$_3$, N, N] | 0.1 | 5 | 5 | 5 | 5 | 5 | 5 | 5 | 2 | 5 |
|  | 0.05 | 5 | 5 | 5 | 5 | 5 | 5 | 5 | 1 | 5 |
|  | 0.025 | 3 | 5 | 5 | 5 | 0 | 5 | 4 | 0 | 3-4 |
| ($2_3$) [structure: benzene fused to ring with C=NH, N-CH$_3$, C-S-CH$_3$, N, N] | 0.1 | 5 | 5 | 5 | 5 | 5 | 5 | 5 | 5 | 5 |
|  | 0.05 | 5 | 5 | 5 | 5 | 5 | 5 | 5 | 4 | 5 |
|  | 0.025 | 4 | 5 | 4-5 | 5 | 5 | 5 | 5 | 3-4 | 4-5 |
| ($1_2$) [structure: benzene fused to ring with C=NH, N-CH$_3$, C-NH-CH$_3$, N, N] | 0.1 | 5 | 5 | 5 | 5 | 5 | 5 | 5 | 3 | 5 |
|  | 0.05 | 5 | 5 | 5 | 5 | 5 | 5 | 5 | 2 | 5 |
|  | 0.025 | 5 | 5 | 5 | 5 | 5 | 5 | 4-5 | 2 | 5 |

EXAMPLE 3

Pre-emergence test

Solvent: Parts by wt.
    Acetone --------------------------------- 5
Emulsifier:
    Alkylaryl polyglycol ether ------------------ 1

To produce a suitable preparation of the particular active compound, 1 part by weight of such active compound is mixed with the stated amount of solvent, the stated amount of emulsifier is added thereto and the resulting concentrate is then diluted with water to the desired final concentration.

Seeds of the test plants are sown in normal soil and, after 24 hours, watered with the preparation of the given active compound. It is expedient to keep constant the amount of water per unit area. The concentration of the given active compound in the preparation is of no importance, only the amount of active compound applied per unit area being decisive. After three weeks, the degree of damage to the test plants is determined and characterized by the values 0–5, which have the following meaning:

0—No effect
1—Slight damage or delay in growth
2—Marked damage or inhibition of growth
3—Heavy damage and only deficient development or only 50% emerged
4—Plants partially destroyed after germination or only 25% emerged
5—Plants completely dead or not emerged.

The particular active compound tested, the amounts applied and the results obtained can be seen from the following Table 3:

EXAMPLE 4

Post-emergence test

Solvent: Parts by wt.
    Acetone --------------------------------- 5
Emulsifier:
    Alkylaryl polyglycol ether ------------------ 1

To produce a suitable preparation of the particular active compound, 1 part by weight of such active compound is mixed with the stated amount of solvent, the stated amount of emulsifier is added thereto and the resulting concentrate is then diluted with water to the desired final concentration.

Test plants which have a height of about 5–15 cm. are sprayed with the given active compound preparation until just dew moist. After three weeks, the degree of damage to the plants is determined and characterized by the values 0–5, which have the following meaning:

0—No effect
1—A few slightly burnt spots
2—Marked damage to leaves
3—Some leaves and parts of stalks partially dead
4—Plant partially destroyed
5—Plant completely dead.

TABLE 3.—PRE-EMERGENCE TEST

| Active compound | Active compound applied in kg./hectare | Echinochloa | Chenopodium | Sinapis | Galinsoga | Stellaria | Matricaria | Baumwolle | Wheat | Maize |
|---|---|---|---|---|---|---|---|---|---|---|
| ($5_1$) [structure: benzene fused to ring with C=NH, N-CH$_3$, C-S-C$_2$H$_5$, N, N] | 5 | 5 | 5 | 5 | 5 | 5 | 5 | 3 | 2 | 3 |
|  | 2.5 | 5 | 5 | 4 | 5 | 5 | 5 | 2 | 1 | 1 |
|  | 1.25 | 4 | 4 | 3 | 5 | 4 | 5 | 1 | 0 | 0 |

The particular active compound tested, their concentrations, and the results obtained can be seen from the following Table 4:

solution of sodium hydroxide and extracted with methylene chloride. The extract, after drying in a vacuum, is distilled off and the residue is crystallized from ligroin.

TABLE 4.—POST-EMERGENCE TEST

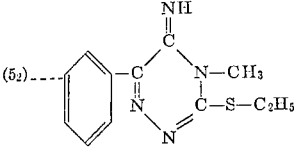

| Active compound | Concentration of active compound in percent | Echinochloa | Chenopodium | Sinapis | Galinsoga | Stellaria | Urtica | Matricaria | Wheat | Beans |
|---|---|---|---|---|---|---|---|---|---|---|
| ($5_2$) | 0.1 | 5 | 5 | 5 | 5 | 5 | 5 | 5 | 5 | 5 |
|  | 0.05 | 5 | 5 | 5 | 5 | 5 | 5 | 5 | 5 | 5 |
|  | 0.025 | 5 | 5 | 5 | 5 | 5 | 5 | 5 | 4 | 3 |

The following further examples are set forth to illustrate, without limitation, the manner of producing the active compounds according to the present invention.

EXAMPLE 5

[Reaction variant (a)]

(i)

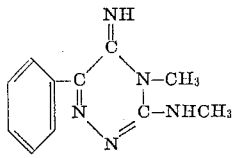

($1_3$)

65 g. benzoyl cyanide-$N_2$-methyl-$N_3$-methyl-guanylhydrazone are boiled for 2 hours with 82 ml. of an alcoholic solution of potassium hydroxide (3.6 N) and 82 ml. methanol. The resulting clear solution crystallizes upon cooling. Thereafter, suction filtration and washing of the crystalline product is effected. Subsequent recrystallization from ethyl acetate yields the compound, 3-methyl-amino-4-methyl-5-imino-6-phenyl-1,2,4-triazine, of M.P. 192° C.

(ii) Preparation of the starting material 13.1 g. benzoyl cyanide are dissolved in 13.1 ml. dimethyl-sulfoxide and added dropwise at about 15° C. to a suspension of 23 g. $N_2$-methyl-$N_3$-methyl-$N_1$-amino-guanidine hydroiodide (prepared from methyl-thiosemicarbazide and methyl iodide upon reaction with methylamine) in 50 ml. water and 100 ml. of 4 N nitric acid. After stirring overnight, cooling, suction filtration and washing are effected.

After digestion with sodium bicarbonate, benzoyl cyanide-$N_2$-methyl-$N_3$-methyl-guanylhydrazone is obtained which, after drying, is recrystallized from ethyl acetate. M.P. 167° C.

EXAMPLE 6

[Reaction variant (b)]

(i)

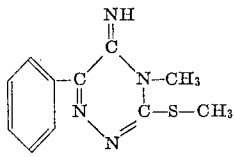

($2_4$)

4.36 (0.02 mole) benzoyl cyanide-$N_1$-methyl-thiosemicarbazone are boiled for 10 minutes with 5.5 ml. methyl-alcoholic solution of potassium hydroxide (3.6 N) and 5.5 ml. methanol. The solution obtained is distilled in a vacuum. The resdue is dissovled in 20 ml. of 1 N solution of sodium hydroxide and precipitated with dilute hydrochloric acid. The 3-mercapto-4-methyl-5-imino-6-phenyl-1,2,4-triazine so obtained is pure, and has a melting point of 249° C. after recrystallization from ethanol.

33 g. of this intermediate mercapto compound, i.e. 3 - mercapto-4-methyl - 5 - imino-6-phenyl-1,2,4-triazine, are suspended in 500 ml. methanol and this is dissolved in 60 ml. of water containing 6.65 g. sodium hydroxide. 30 g. of methyl iodide are then added dropwise, and stirring overnight is effected. The reaction mixture is distilled in a vacuum, and the residue is treated with a 1 N solution of sodium hydroxide and extracted with methylene chloride. The extract, after drying in a vacuum, is distilled off and the residue is crystallized from ligroin.

There is thus obtained 3-methyl-mercapto-4-methyl-5-imino-6-phenyl-1,2,4-triazine of M.P. 100° C.

(ii) Preparation of the starting material 13.1 g. benzoyl cyanide in 13.1 ml. dimethyl sulfoxide are added dropwise at 0–5° C. to 10.5 g. methyl-thiosemicarbazide in 100 ml. of 2 N nitric acid.

After stirring overnight and water cooling, suction filtration is effected, followed by washing with water. After drying, recrystallization from methanol is effected. There is thus obtained benzoyl cyanide-$N_2$-methyl-thiosemicarbanzone of M.P. 205° C.

EXAMPLE 7

In an analogous manner to the procedure of Examples 5 and 6, as the case may be, the following compounds according to the present invention are also prepared:

($4_2$)

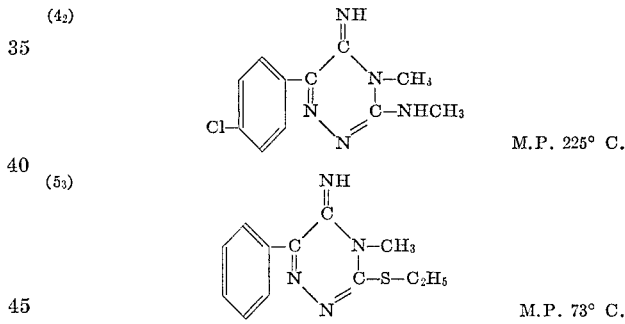

M.P. 225° C.

($5_3$)

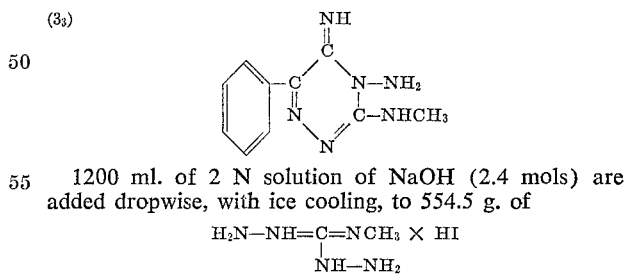

M.P. 73° C.

EXAMPLE 8 [REACTION VARIANT (a)]

($3_3$)

1200 ml. of 2 N solution of NaOH (2.4 mols) are added dropwise, with ice cooling, to 554.5 g. of $$H_2N-NH=C=NCH_3 \times HI$$
$$\phantom{H_2N-NH=C=}|$$
$$\phantom{H_2N-NH=C=N}NH-NH_2$$

(2.4 mols).

Thereupon 4800 ml. of 4 N nitric acid are then run in at about 0 to 6° C., with cooling.

To this solution there are added dropwise, at about 0° C., 314 g. of benzoyl cyanide (2.4 mols) in 310 ml. of dimethylsulfoxide. The temperature is kept at about 0° C. for approximately an additional 6 hours; cooling is then effected overnight with running water (temp. M.P. to 15° C.). After cooling to about 5° C., suction filtration is effected, followed by washing once with water.

The grey product obtained is treated with 2 N solution of sodium hydroxide, during which it is converted into a yellow powder. It is filtered off with suction and washed neutral with water. After drying at about 70° C., 356 g. of crude product are obtained. This is boiled up with 2 litres of absolute alcohol for about 20 minutes, filtered off hot with suction, and washed. There are thus obtained 268 g. of 3-methyl-amino-4-amino-5-imino-6-phenyl-1,2,4-triazine of decomposition point 220° C.

After longer boiling with charcoal and strong concentration, the mother liquor yields a further 20 g. of the same product.

It will be realized by the artisan that all of the foregoing compounds contemplated by the present invention possess the desired selective or total herbicidal properties, and especially the capability of selectively destroying weeds, as well as a comparatively low toxicity toward warm-blooded creatures and a concomitantly low phytotoxicity with respect to higher plants, enabling such compounds to be used with correspondingly favorable compatibility with respect to warm-blooded creatures and higher plants for more effective control and/or elimination of weeds by selective application of such compounds to such weeds and/or their habitat. Nevertheless, the instant compounds possess total herbicidal action when used in large quantities, although selective herbicidal action is obtained when used in smaller quantities. As contemplated herein, the term "weeds" is meant to include not only weeds in the narrow sense, but also in the broad sense, whereby to cover all plants and vegetation considered undesirable for the particular purposes in question.

It will be appreciated that the instant specification and examples are set forth by way of illustration and not limitation, and that various modifications and changes may be made without departing from the spirit and scope of the present invention.

What is claimed is:

1. 5-imino-1,2,4-triazine of the formula

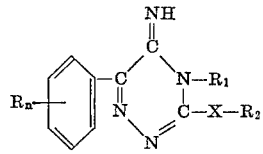

in which R is chloro, $n$ is a whole number from 0–1, $R_1$ is selected from the group consisting of alkyl of 1–4 carbon atoms and amino, $R_2$ is alkyl of 1–4 carbon atoms, X is selected from the group consisting of sulfur and —$NR_3$—, and $R_3$ is selected from the group consisting of hydrogen and alkyl of 1–4 carbon atoms.

2. Compound according to claim 1 wherein R is chloro, $n$ is 0–1, $R_1$ is selected from the group consisting of $C_{1-4}$ alkyl and amino, $R_2$ is $C_{1-4}$ alkyl, X is selected from the group consisting of sulfur and —$NR_3$—, and $R_3$ is hydrogen.

3. Compound according to claim 1 wherein R is 4-chloro, $n$ is 0–1, $R_1$ is selected from the group consisting of $C_{1-2}$ alkyl and amino, $R_2$ is $C_{1-4}$ alkyl, and X is selected from the group consisting of sulfur and —NH—.

4. Compound according to claim 1 wherein R is chloro, $n$ is 0–1, $R_1$ is selected from the group consisting of $C_{1-4}$ alkyl and amino, $R_2$ is $C_{1-4}$ alkyl, X is —NH—.

5. Compound according to claim 1 wherein $n$ is 0, $R_1$ is selected from the group consisting of $C_{1-4}$ alkyl and amino, $R_2$ is $C_{1-4}$ alkyl, and X is sulfur.

6. Compound according to claim 1 wherein such compound is 3 - methyl - amino - 4 - methyl - 5 - imino-6-phenyl-1,2,4-triazine of the formula

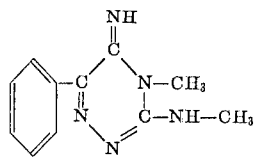

7. Compound according to claim 1 wherein such compound 3 - methyl - mercapto - 4 - methyl - 5 - imino-6-phenyl-1,2,4-triazine of the formula

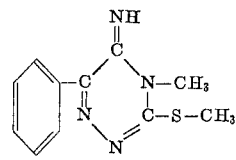

8. Compound according to claim 1 wherein such compound is 3 - methyl - amino - 4 - amino - 5 - imino-6-phenyl-1,2,4-triazine of the formula

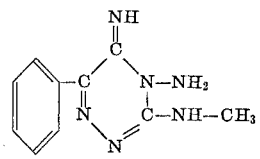

9. Compound according to claim 1 wherein such compound is 3 - methyl - amino - 4 - methyl - 5 - imino-6-(4'-chloro-phenyl)-1,2,4-triazine of the formula

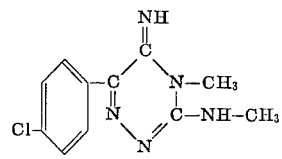

10. Compound according to claim 1 wherein such compound is 3 - ethyl - mercapto - 4 - methyl - 5 - imino-6-phenyl - 1,2,4 - triazine of the formula

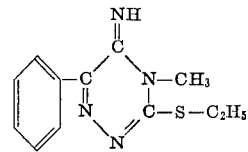

References Cited

UNITED STATES PATENTS 2,258,320   10/1941   Ericks _____ 260—249.5
3,129,699    4/1964   Millikan _____ 260—249.5X JOHN M. FORD, Primary Examiner U.S. Cl. X.R.

71—93; 260—564, 249.9

UNITED STATES PATENT OFFICE
CERTIFICATE OF CORRECTION

Patent No. 3,586,680      Dated June 22, 1971

Inventor(s) 1) Werner Meiser   2) Ludwig Eue   3) Helmuth Hack
     4) Helmut Timmler   5) Richard Wegler It is certified that error appears in the above-identified patent and that said Letters Patent are hereby corrected as shown below:

Column 2, line 58 delete "or hydrogen;"

Column 4, line 10, Formula IIIa

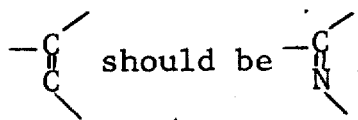

Column 4, line 14, Formula $2_1$

—CH    should read   —$CH_3$

Column 12, line 3

"crystallized" should   --recrystallized--

Signed and sealed this 21st day of December 1971.

(SEAL)
Attest:

EDWARD M. FLETCHER, JR.      ROBERT GOTTSCHALK
Attesting Officer             Acting Commissioner of Patents